United States Patent
Prendergast et al.

(10) Patent No.: US 7,110,531 B2
(45) Date of Patent: Sep. 19, 2006

(54) ISOLATION SYSTEM WITH ANALOG COMMUNICATION ACROSS AN ISOLATION BARRIER

(75) Inventors: Colm J. Prendergast, Cambridge, MA (US); Olafur Josefsson, North Reading, MA (US); James Wilson, Foxboro, MA (US); Daniel T. Boyko, Norwood, MA (US)

(73) Assignee: Analog Devices, Inc., Norwood, MA (US)

( * ) Notice: Subject to any disclaimer, the term of this patent is extended or adjusted under 35 U.S.C. 154(b) by 141 days.

(21) Appl. No.: 09/784,827

(22) Filed: Feb. 15, 2001

(65) Prior Publication Data

US 2001/0028320 A1    Oct. 11, 2001

Related U.S. Application Data

(63) Continuation of application No. 60/183,107, filed on Feb. 17, 2000.

(51) Int. Cl.
*H04M 1/00* (2006.01)
*H04M 9/00* (2006.01)

(52) U.S. Cl. .................. 379/399.01; 379/399.02; 379/413.02; 379/413.04

(58) Field of Classification Search .............. 375/261, 375/222, 38, 5, 8; 379/99, 98, 97, 93, 399.01–413.04
See application file for complete search history.

(56) References Cited

U.S. PATENT DOCUMENTS

| | | | |
|---|---|---|---|
| 4,387,273 A * | 6/1983 | Chea, Jr. | |
| 4,539,552 A * | 9/1985 | Davis et al. | 341/126 |
| 4,563,547 A | 1/1986 | Booth | 179/16 AA |
| 4,748,419 A | 5/1988 | Somerville | |
| 4,835,486 A | 5/1989 | Somerville | 330/10 |
| 4,843,339 A | 6/1989 | Burt et al. | 330/10 |
| 5,022,024 A | 6/1991 | Paneth et al. | 370/50 |
| 5,155,743 A | 10/1992 | Jacobs | 375/28 |
| 5,293,421 A * | 3/1994 | Zanzig | |
| 5,353,310 A | 10/1994 | Russell et al. | 375/101 |
| 5,369,687 A | 11/1994 | Farkas | 379/98 |
| 5,392,218 A * | 2/1995 | Emmerich | 364/483 |
| 5,500,894 A * | 3/1996 | Hershbarger | 379/399.01 |
| 5,500,895 A * | 3/1996 | Yurgelites | 379/399.01 |
| 5,537,441 A * | 7/1996 | Bremer et al. | 375/261 |
| 5,550,993 A * | 8/1996 | Ehlig et al. | |
| 5,574,396 A * | 11/1996 | Drainville | 327/337 |
| 5,602,912 A * | 2/1997 | Hershbarger | 379/402 |
| 5,654,984 A | 8/1997 | Hershbarger et al. | 375/257 |
| 5,724,363 A | 3/1998 | Breya | 371/5.5 |
| 5,870,046 A | 2/1999 | Scott et al. | 341/143 |
| 5,883,907 A | 3/1999 | Hoekstra | |

(Continued)

OTHER PUBLICATIONS

"Signal Isolation Buffer Amplifiers" product brochure, 15 pages, Burr-Brown Corporation, 1987.

(Continued)

*Primary Examiner*—Fan Tsang
*Assistant Examiner*—Ramnandan Singh
(74) *Attorney, Agent, or Firm*—Iandiorio & Teska (57) ABSTRACT

An isolation system with analog communication across an isolation barrier includes an isolation barrier circuit having at least one isolation element; a digital to analog circuit having an analog output connected to the isolation barrier and an input for receiving an input digital signal to be communicated across the isolation barrier; and an analog to digital circuit having an input coupled to the analog output of the isolation barrier circuit for providing a digital output signal.

4 Claims, 8 Drawing Sheets

U.S. PATENT DOCUMENTS

| | | | | |
|---|---|---|---|---|
| 5,966,297 A | * | 10/1999 | Minegishi | 330/59 |
| 6,081,586 A | * | 6/2000 | Rahamim et al. | |
| 6,107,948 A | | 8/2000 | Scott et al. | 341/143 |
| 6,134,578 A | * | 10/2000 | Ehlig et al. | |
| 6,137,827 A | | 10/2000 | Scott et al. | 375/219 |
| 6,151,335 A | | 11/2000 | Ko et al. | 370/487 |
| 6,167,132 A | | 12/2000 | Krone et al. | 379/399 |
| 6,184,829 B1 | | 2/2001 | Stilp | 342/387 |
| 6,304,594 B1 | | 10/2001 | Salinger | |
| 6,415,003 B1 | | 7/2002 | Raghavan | |
| 6,434,199 B1 | | 8/2002 | Desrosiers et al. | |
| 6,545,785 B1 | * | 4/2003 | Heflinger et al. | 359/154 |
| 6,587,560 B1 | * | 7/2003 | Scott et al. | 379/413.02 |

OTHER PUBLICATIONS

Burr-Brown Corporation, *Signal Isolation Buffer Amplifiers*, 1997, Tucson.

"Signal Isolation Buffer Amplifiers" product brochure, 15 pages, Burr-Brown Corporation, 1987.

* cited by examiner

ISOLATION SYSTEM WITH ANALOG COMMUNICATION ACROSS AN ISOLATION BARRIER

RELATED APPLICATIONS

This application claims priority of U.S. Provisional Application No. 60/183,107 filed on Feb. 17, 2000 entitled "ISOLATED ANALOG COMMUNICATIONS INTERFACE."

FIELD OF INVENTION

This invention relates to an isolation system with analog communication across an isolation barrier.

BACKGROUND OF INVENTION

With the increasing demand for integration of asymmetrical digital subscriber lines (ADSL's) and V90 modems or plain old telephone systems (POT's) the barrier isolation transformer has been split so that one part responds to the tip and ring lines to communicate with the ADSL modem and another part communicates with the POTS or V90 modem. There are a number of problems with this approach. Transformers are lossy, introduce distortion and have limited as well as non-linear response and are relatively large and expensive. Presently, there is no suitable transformer to handle both the POTS and ADSL bandwidth with the required performance level. In another approach the isolation barrier was moved back to the digital portion of the circuit and was implemented with capacitors but this was for V90 or POTS modems only and did not encompass the ADSL circuits.

BRIEF SUMMARY OF THE INVENTION

It is therefore an object of this invention to provide an improved isolation system with analog communication across an isolation barrier.

It is a further object of this invention to provide such an improved isolation system which accommodates both ADSL and POTS.

It is a further object of this invention to provide such an improved isolation system which can function without transformers as the isolation barrier elements.

It is a further object of this invention to provide such an improved isolation which is lower in cost, and smaller.

It is a further object of this invention to provide such an improved isolation which has better signal integrity and performance.

It is a further object of this invention to provide such an improved isolation which can be capacitor or transformer based.

It is a further object of this invention to provide such an improved isolation which has good common mode rejection.

It is a further object of this invention to provide such an improved isolation which is applicable not only to modems in ADLS and POTS environments but to any high data rate transmission requiring isolation such as medical, telephone, industrial processes and other communications applications.

The invention results from the realization that an improved isolation system with analog communication across an isolation barrier which can accommodate both ADSL and POTS and can use transformers or capacitors, can be achieved with an isolation barrier circuit having at least one isolation element, a digital to analog circuit having an analog output connected to the isolation barrier and an input for receiving an input digital signal to be communicated across the isolation barrier and an analog to digital circuit having an input coupled to the analog output of the isolation barrier circuit for providing a digital output signal. It was further realized that performance could be enhanced by shaping the analog signal to be transmitted through the isolation barrier so that it exhibited a constant signal average.

This invention features an isolation system with analog communication across an isolation barrier including an isolation barrier circuit having at least one isolation element. The digital to analog circuit has an analog output connected to the isolation barrier and an input for receiving an input digital signal to be communicated across the isolation barrier. An analog to digital circuit has an input coupled to the analog output of the isolation barrier circuit for providing a digital output signal.

In a preferred embodiment the digital to analog circuit may include an encoder circuit responsive to the input digital signal to provide a digital signal having a constant signal average, and a digital to analog converter responsive to the digital signal to provide to the isolation barrier the analog output signal having a constant signal average. The digital to analog circuit may include a digital to analog converter with an input for receiving the input digital signal and a modulation circuit responsive to the digital to analog converter for providing the analog output having a constant signal average. The analog to digital circuit may include an analog to digital converter responsive to the constant average input analog signal from the isolation barrier and a decoder responsive to the digital signal to provide the digital output signal. The analog to digital circuit may include a demodulator circuit responsive to the constant average input analog signal from the isolation barrier and an analog to digital converter responsive to the analog signal to provide the digital output signal. The analog to digital circuit may include an analog to digital converter. The digital to analog circuit may include a digital to analog converter. The digital to analog circuit may include a termination resistance connected with the isolation barrier. The analog to digital circuit may include a termination resistance connected with the isolation barrier. The isolation element may include a capacitance. The isolation element may include a transformer. The analog to digital circuit may include a common mode interference signal sensing circuit and a summing circuit for removing the common mode interference signal from the analog signal from the isolation barrier. The digital signal to be communicated across the isolation barrier may include data or may include control information or both. The control information may include reference or calibration information.

This invention also features a bi-directional isolation system with analog communication across an isolation barrier comprising an isolation barrier circuit having at least one isolation element and a first digital to analog circuit having an analog output connected to the isolation barrier and an input for receiving an input digital signal to be communicated across the isolation barrier. There is also a first analog to digital circuit having an input coupled to the analog output of the isolation barrier circuit for providing a digital output signal. There is a second digital to analog circuit having an analog output connected to the isolation barrier and an input for receiving an input digital signal to be communicated across the isolation barrier. A second analog to digital circuit has an input coupled to the analog output of the isolation barrier circuit for providing a digital output signal.

In a preferred embodiment, the input digital signals may be communicated simultaneously across the isolation barrier circuit. The input digital signals may be communicated alternately across the isolation barrier circuit. The bi-directional isolation system may include at least one echo cancellation circuit for removing a local echo signal from at least one of the first and second analog to digital circuits.

BRIEF DESCRIPTION OF THE DRAWINGS

Other objects, features and advantages will occur to those skilled in the art from the following description of a preferred embodiment and the accompanying drawings, in which.

PREFERRED EMBODIMENT

Figure 1:
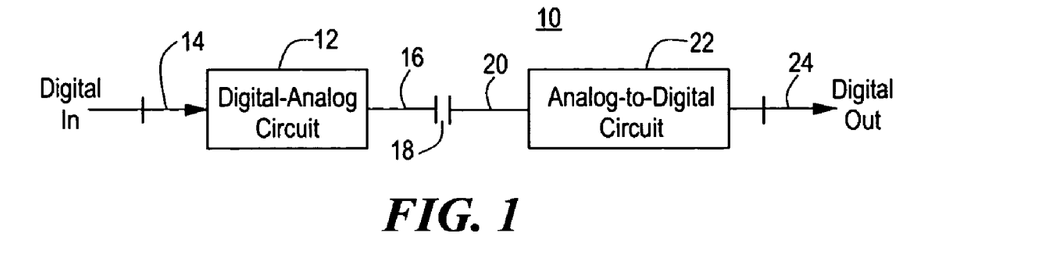
FIG. 1 is a schematic block diagram of a unidirectional digital isolation system according to this invention.

There is shown in FIG. 1 a digital isolation system 10 according to this invention including a digital to analog circuit 12 which receives the digital input at 14 and converts it to an analog output at 16. The analog output 16 is transferred across the isolation barrier 18 shown here simply as a single capacitor for illustrative purposes. The analog signal on the output 20 of isolation barrier 18 is delivered to analog to digital circuit 22 where it is converted back to a digital signal to provide the digital output at 24. The digital input and thus the digital output may be data, reference/calibration information or control information or a mixture of them. In addition, throughout this description, although the schematics are shown in single line format the system may be implemented in a differential mode. In addition the signals across the isolation barrier may be unidirectional or bi-directional and if bi-directional may be simultaneous or alternating.

Figure 2:
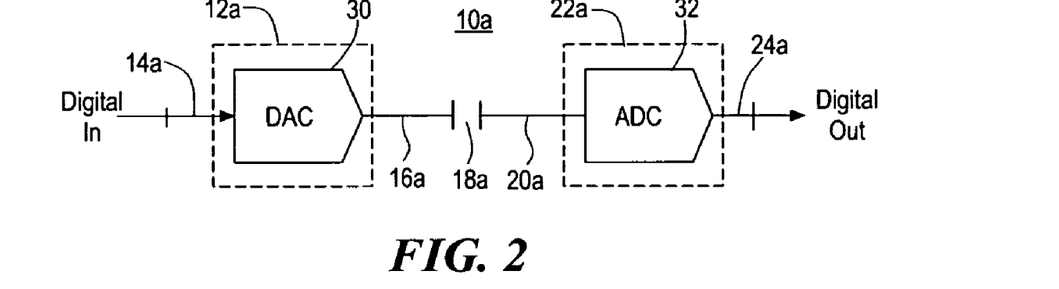
FIG. 2 is a schematic block diagram similar to FIG. 1 implemented with a digital to analog converter (DAC) and analog to digital converter (ADC).

In one embodiment, digital to analog circuit 12a, FIG. 2 may be implemented simply with a digital to analog converter 30 and analog to digital circuit 22a may be implemented simply with an analog to digital converter 32. Both system 10 and 10a in FIGS. 1 and 2 are shown as unidirectional devices but the invention applies as well to bi-directional devices as will be explained hereinafter with respect to FIG. 9.

Figure 3:
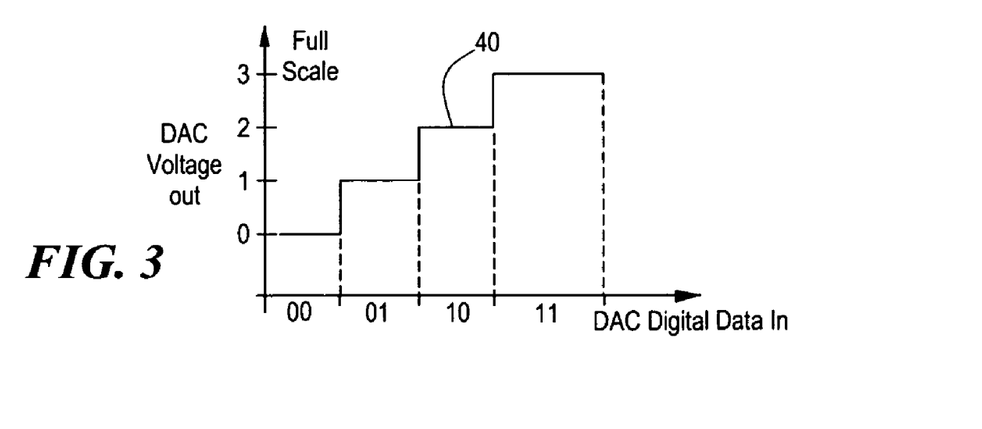
FIG. 3 illustrates the transfer function of the digital to analog converter of FIG. 2.
Figure 4:
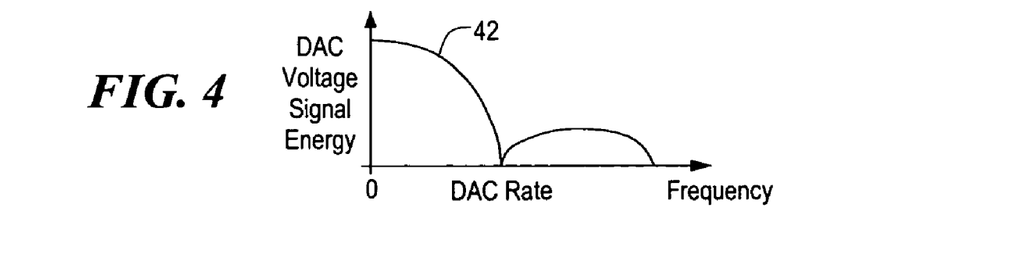
FIG. 4 illustrates the frequency spectrum of the DAC output of FIG. 2.
Figure 5:
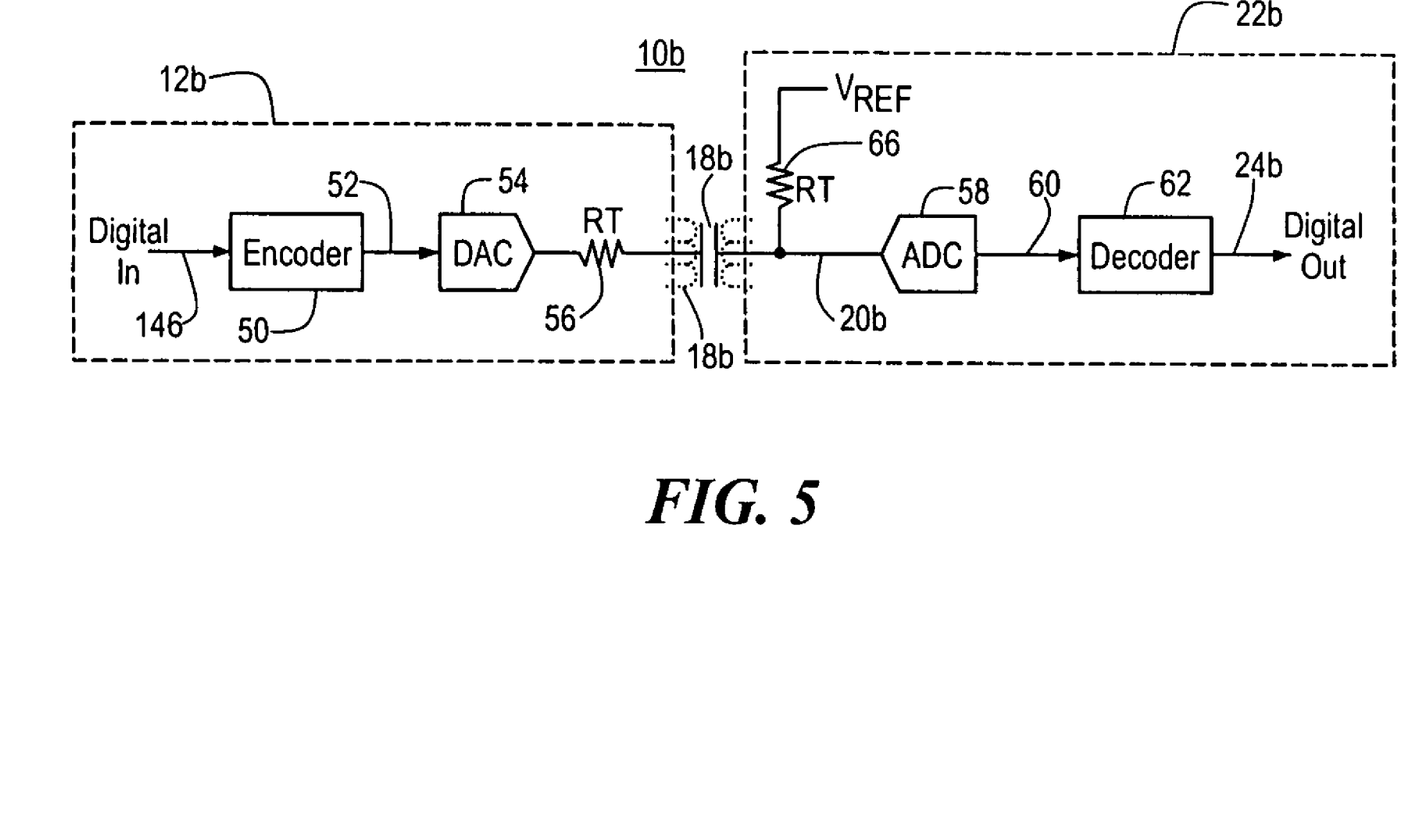
FIG. 5 is a view similar to FIG. 1 implemented with an encoder and a digital to analog converter and an analog to digital converter and a decoder.

The transfer function 40, FIG. 3 of DAC 30 shows DC voltages of 0, 1, 2, and 3 for the digital inputs of 00, 01, 10, and 11. When the simple straight forward implementation of DAC 30 is used a problem can occur because the signal level may remain steady when the particular digital input value remains unchanged for a number of contiguous clock pulses. Thus, if the digital value 01 was transmitted for three or four clock cycles or more, there would be no change in the voltage level and there would be a loss of signal across the capacitor 18 of the isolation barrier which cannot pass or transmit DC levels. The frequency spectrum of DAC 30 appears as shown at 42 at FIG. 4 where it can be seen that most of the energy is concentrated at lower frequencies which are blocked by the capacitor. To improve the performance of the system in accordance with this invention, some means is employed in order to effect the signal transmitted across the isolation barrier so that it has a constant average signal in the nature of a periodic signal so that it passes normally through a capacitive or transformer coupling. One implementation to address this problem is shown in FIG. 5 where digital to analog circuit 12b includes an encoder 50 that receives the digital input at 14b and delivers such a constant average signal to the input 52 of DAC 54. A termination resistor 56 has also been added to affect common mode rejection. Since this is a unidirectional embodiment termination resistance 56 is not actually required. Analog to digital circuit 22b includes an analog to digital converter 58 which senses the constant signal average output 20b from isolation barrier 18b, converts it to a digital signal, and delivers it to decoder 62. Decoder 62 then provides the digital output on line 24b. Analog to digital circuit 22b also includes a termination resistance 66 to reduce common mode errors. Common mode rejection or reduction is accomplished because any common mode signal that occurs across resistance 56 and isolation element 18b will be suppressed through resistance 66 and $V_{ref}$ so that the input 20b to ADC 58 can be kept at its proper level. The isolation circuit need not be capacitive. It could as well be a transformer as shown at 18b.

Figure 6:
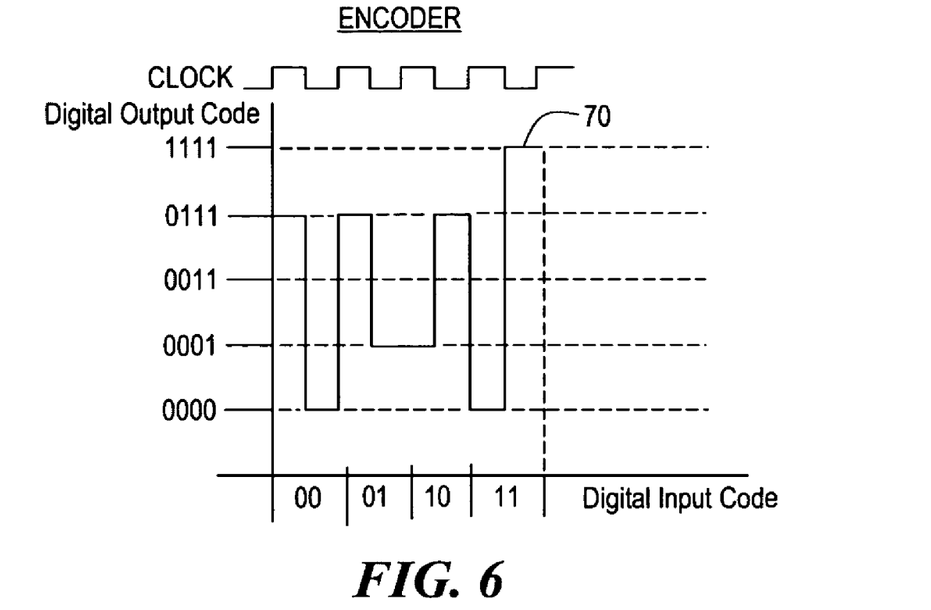
FIG. 6 illustrates the transfer function of the encoder of FIG. 5.
Figure 7:
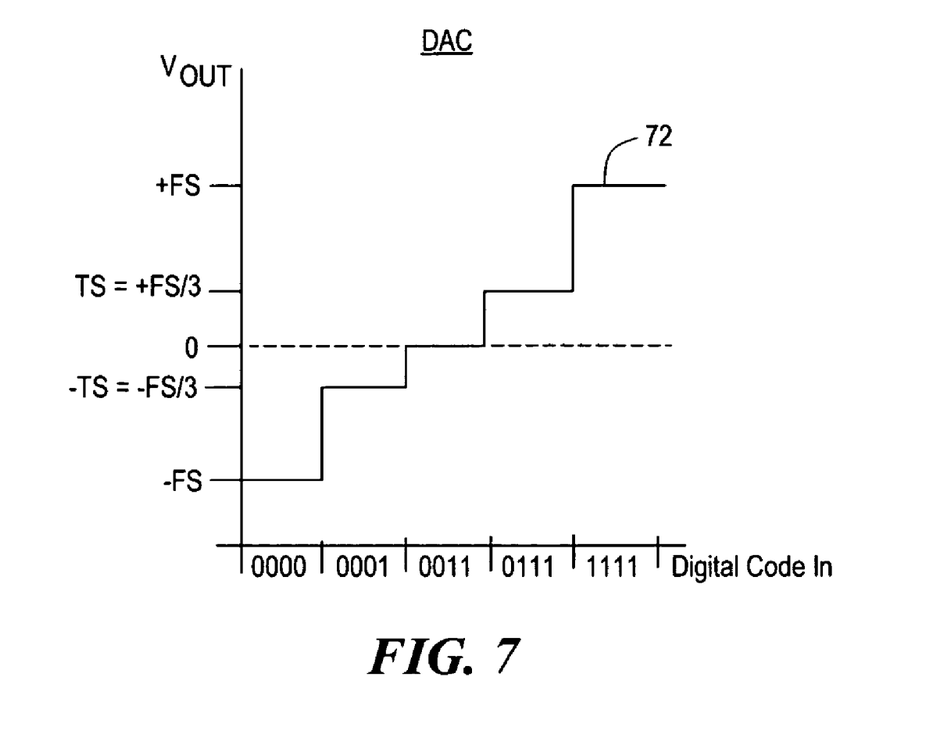
FIG. 7 illustrates the transfer function of the digital to analog converter of FIG. 5.
Figure 8A:
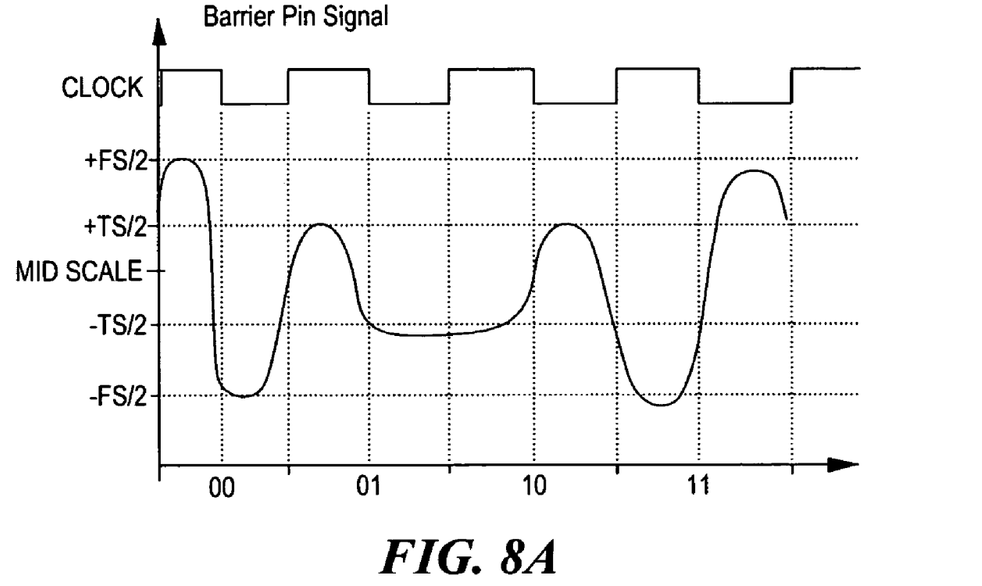
FIG. 8A illustrates the transfer function of the DAC and encoder of FIG. 5.
Figure 8B:
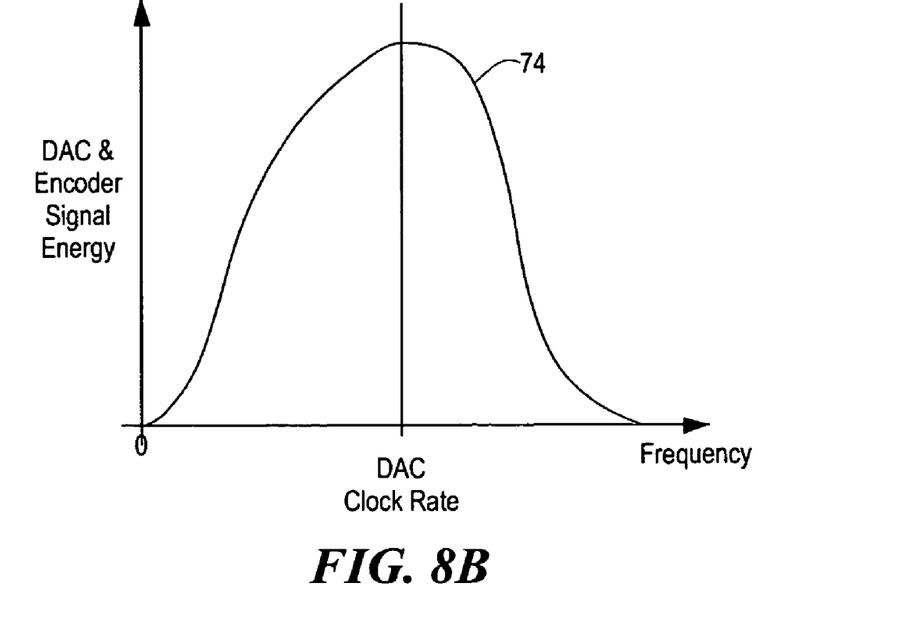
FIG. 8B illustrates the frequency spectrum of the digital to analog converter of FIG. 5 provided with the input from the encoder of FIG. 5.

Encoder 50 has a transfer function 70, FIG. 6 which has a constant average. For example, the digital input codes 00, 01, 10 and 11 produce the encoded output signal 70 as follows: input code 00 is represented by a change of digital output code four "1's", 1111 on the first phase of the clock to 0000 on the second phase of the clock. Digital input code 01 is represented by a change of output code from 0111 to 0001. Digital input code 10 is represented by a change in digital output code from 0001 to 0111 and digital input code 11 is represented by the digital output code changing 0000 to 1111. In this case the output codes are thermometer encoded i.e., the weight of the code is determined by the number of '1's contained in it. Over a full clock cycle the average output code (between the first and second phases) in all cases is 0011. This is an example of a constant average signal. When these code transitions are delivered to DAC 54 it produces voltage levels as shown in FIG. 7 with respect to transfer function 72. There it can be seen that the center or constant average at 0 is centered between +third scale (+TS) and −thirdscale (−TS) and +full scale (+FS) and −full scale (−FS). The digital output code derived from encoder 50 then is represented by the levels as shown in FIG. 7. Thus digital output code 0000 is represented by −FS; 0001 by −TS; 0011 by 0; 0111 by +TS and 1111 by +FS. The resulting signal on barrier pin 16b of FIG. 5 is illustrated in FIG. 8A. This results in a much improved frequency distribution for the output of the DAC as shown in FIG. 8B where its characteristic 74 can be seen as gaussian in nature and not concentrated at the low frequency end of the spectrum. This makes it well suited for transmission through the isolation barrier implemented by capacitive or transformer elements.

Figure 9:
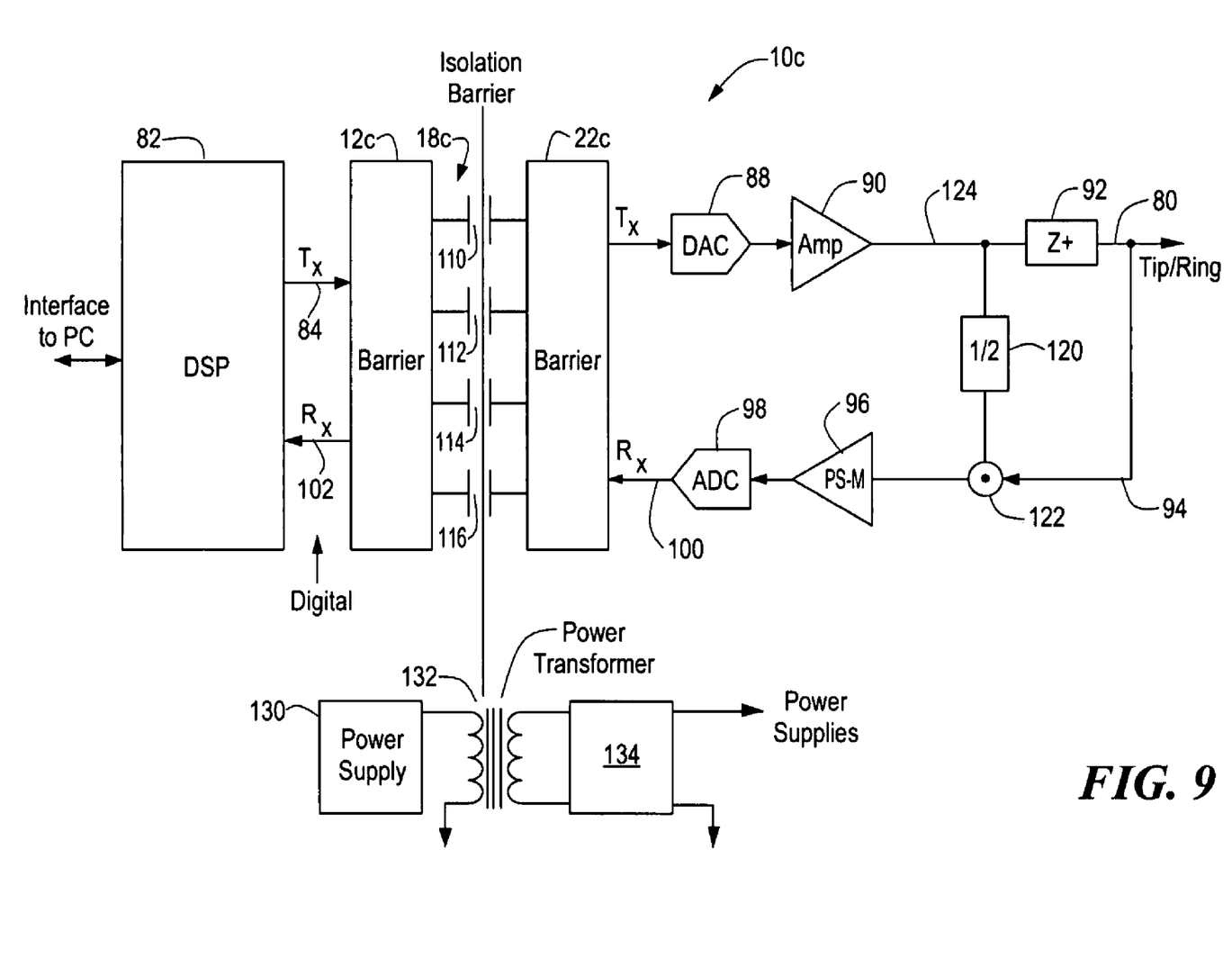
FIG. 9 is a schematic block diagram of a bi-directional digital isolation system in an ADSL/POTS typical telephone arrangement according to this invention.

In one embodiment, the isolation system according to this invention, 10c, FIG. 9, is incorporated in a typical telephone system between the tip and ring lines 80 and associated circuitry and a digital signal processor (DSP) 82 which may, for example, interface with a personal computer or other device. In this implementation barrier interface circuit 12c, isolation barrier 18c, and barrier interface circuit 22c are bi-directional. Thus, the digital signal processor 82 delivers a signal $T_x$ on line 84 to barrier interface circuit 12c which is passed through isolation barrier 18c to barrier interface circuit 22c. The transmitted signal $T_x$ appears on line 86 where it is submitted to a digital to analog converter 88. The analog signal is amplified in amplifier 90 and passed through termination impedance 92 to the output at 80 of the tip and ring line. Received signals also appearing on tip and ring line 80 are delivered on line 94 through amplifier 96 to analog to digital converter 98 which delivers the received signal $R_x$ on line 100 to barrier interface circuit 22c. The received signal $R_x$ is transmitted across isolation barrier 18c to the input of barrier interface circuit 12c from which the received signal $R_x$ appearing on line 102 is delivered to the digital signal processor 82 or other equipment. Barrier interface 12c and barrier interface 22c each include an analog to digital circuit and a digital to analog circuit since they transmit and receive bi-directionally through isolation barrier 18c, which is indicated by the presence of a number of capacitors 110, 112, 114, and 116. There are a number of channels and each of them has an analog to digital circuit and digital to analog circuit associated with it. Local echo cancellation is achieved by divider circuit 120 and summing circuit 122. The transmit signal on line 124 is halved in divider circuit 120 and then subtracted from the echoed signal on line 94 in summing circuit 122 so that the received signal on line 94 when submitted to amplifier 96 is essentially free of the local echo or reflection of the transmit signal on line 124 coming from DAC 188. Power may be supplied from a suitable power supply through power supply 130, through power transformer 132, and distributor circuit 134.

Figure 10:
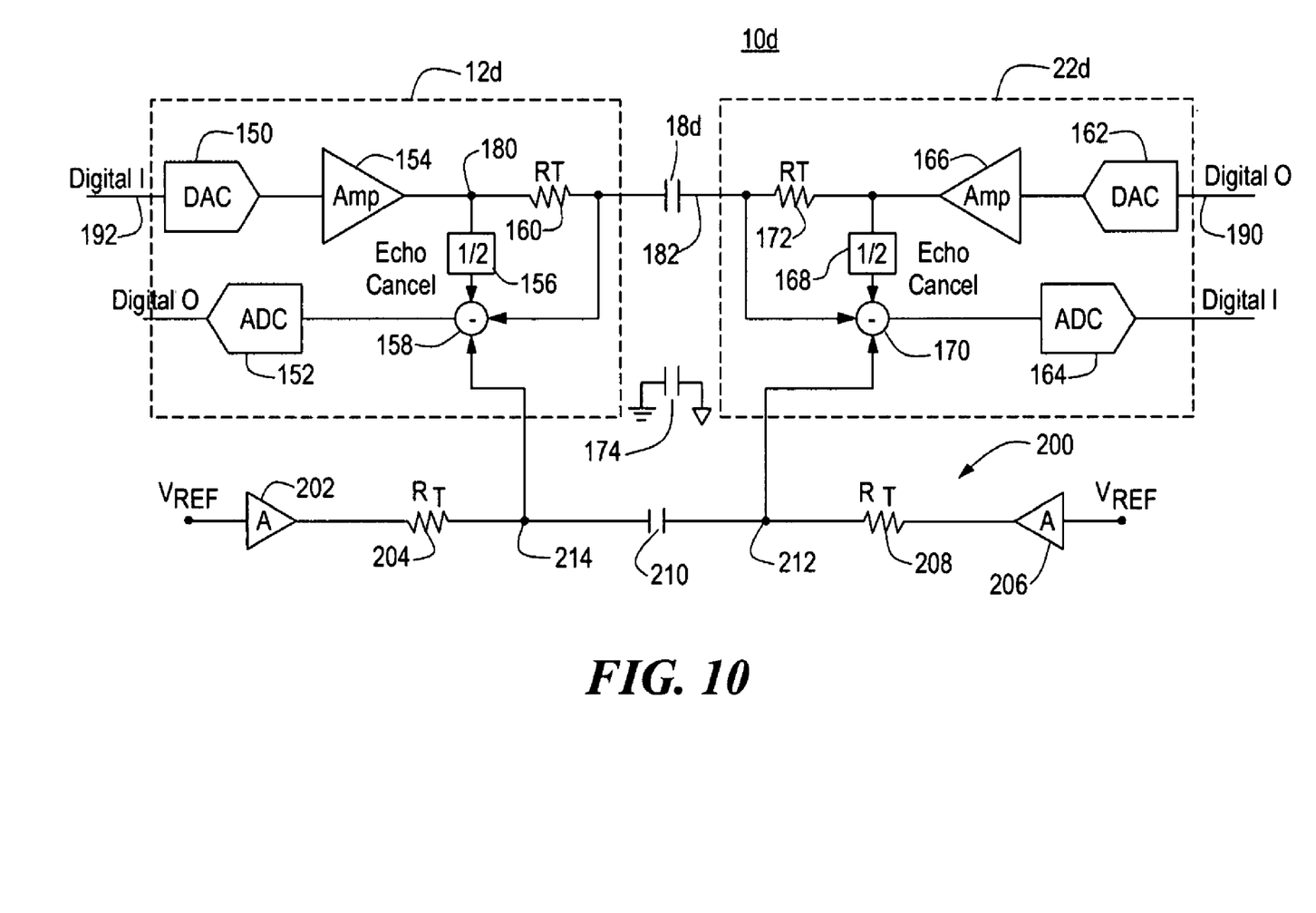
FIG. 10 is a schematic block diagram of part of the bi-directional digital isolation system of FIG. 9 with additional common mode rejection.

Isolation system 10d of FIG. 10 includes additional common mode compensation. Since isolation system 10d is simultaneous bi-directional, digital to barrier interface circuit 12d includes a digital to analog converter 150 and an analog to digital converter 152 as well as an amplifier 154 and an echo cancellation circuit including divide by two circuit 156 and summing circuit 158. Also included is termination resistance 160. Similarly, barrier interface circuit 22d includes a digital to analog converter 162 and analog to digital converter 164. It also includes an amplifier 166 and an echo cancellation circuit including divide by two circuit 168 and summing circuit 170. Also included is termination resistance 172. A ground capacitor 174 is employed to provide a current return path for the signals being transmitted through isolation barrier 18d. The effect of termination resistors 160 and 172 on the barrier signals is to limit the voltage at 182 to a function of the digital signal at input 190 plus that at input 192 divided by two.

In the first instance, common mode rejection is effected through termination resistances 160 and 172 in addition to isolation element, 18d. To further reduce the common mode interference, common mode rejection circuit 200 may be employed. It consists of an amplifier 202 and termination resistor 204 on one side and a similar amplifier 206 and termination resistance 208 on the other side with an isolation capacitor 210 between them. Amplifiers 202 and 206 are driven by a DC common mode signal. Any variation in that common mode signal is sensed at 210 and 212 respectively, and delivered to summing circuits 158 and 170, respectively, where they are subtracted from the incoming signal. This further reduces the common mode interference signals beyond what is accomplished by termination resistors 160 and 172 and isolation capacitor 18d.

Figure 11:
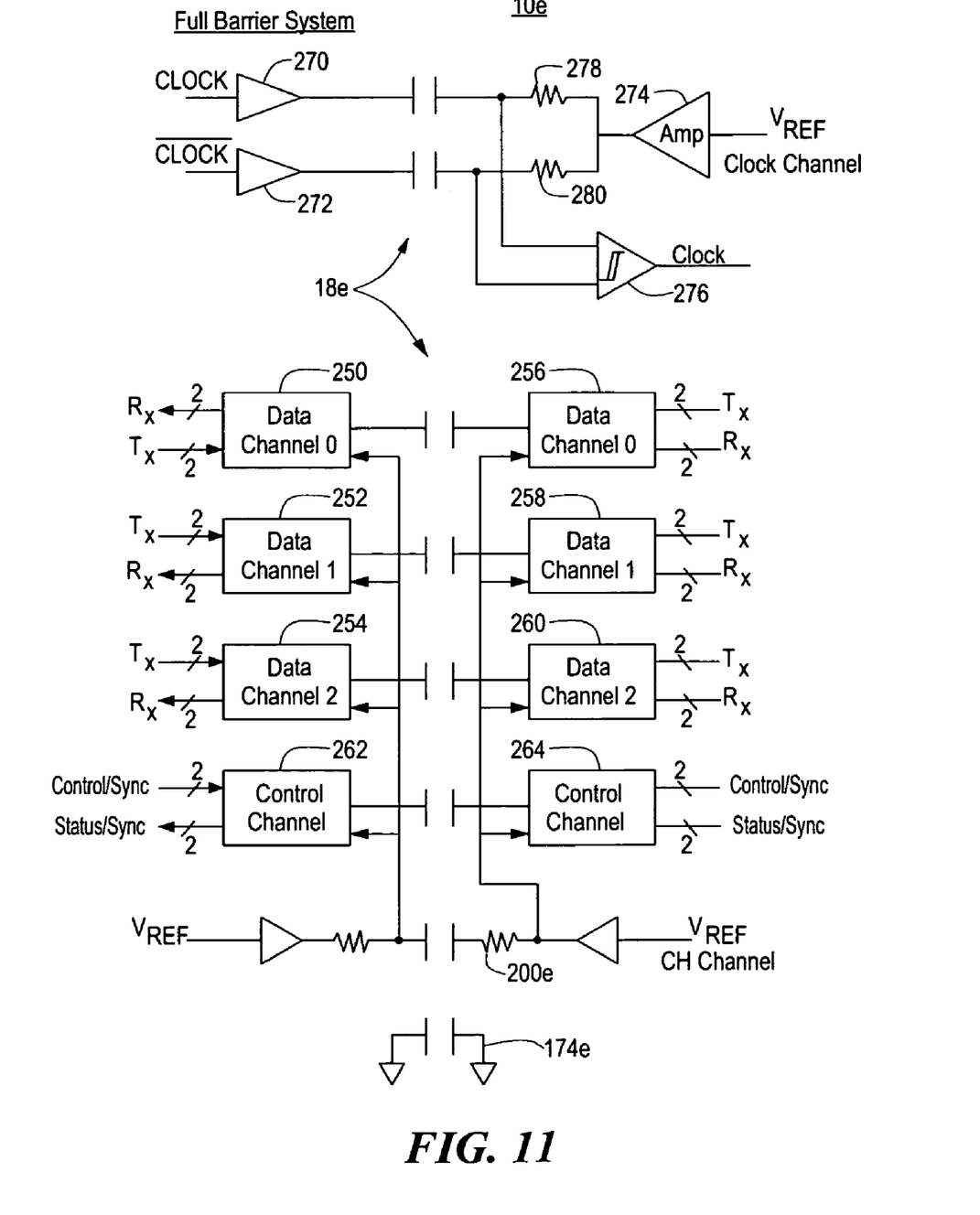
FIG. 11 is a schematic block diagram in greater detail of a full barrier isolation system according to this invention.
Figure 12:
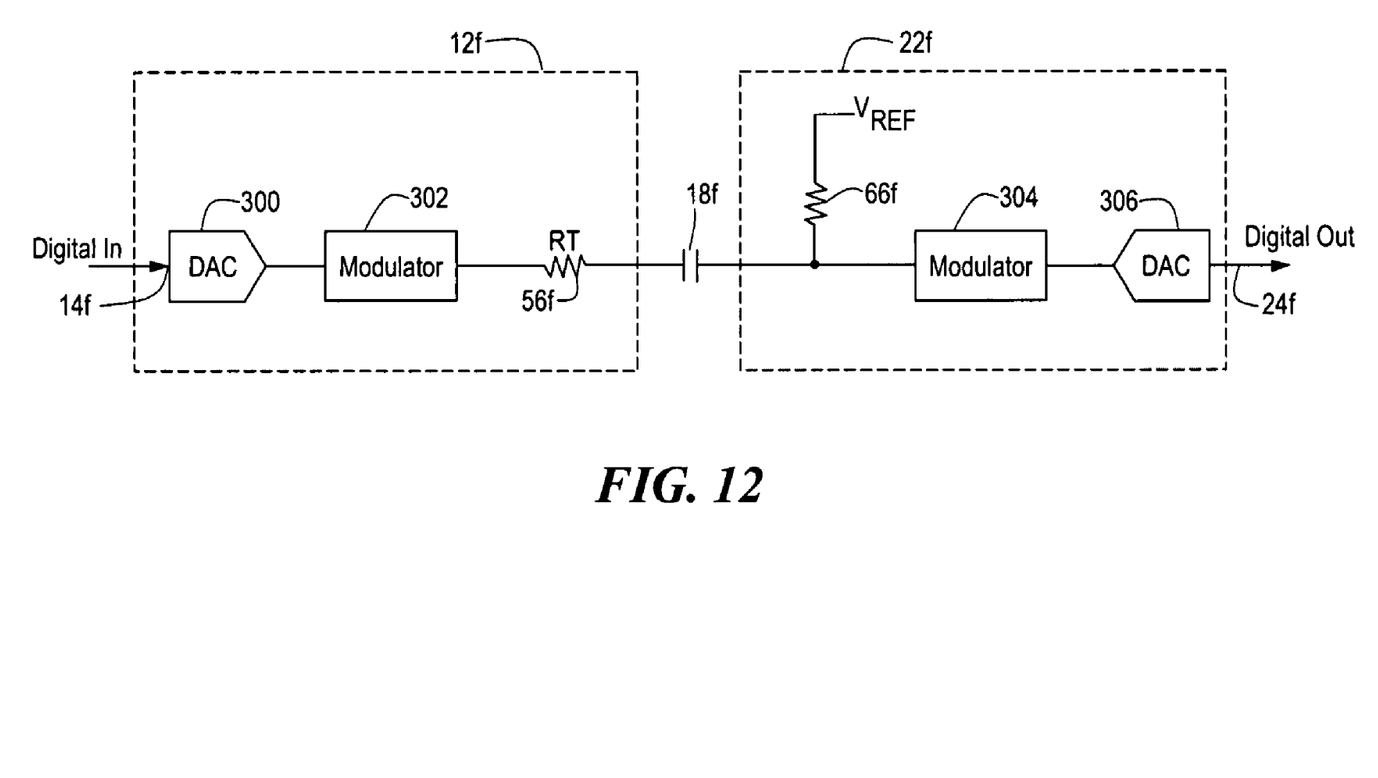
FIG. 12 is a view similar to FIG. 1 implemented with a digital to analog converter, a modulation circuit, a de-modulation circuit, and an analog to digital converter.

A more detailed embodiment of the invention is shown in FIG. 11 which includes a number of data channels 250, 252, 254, 256, 258 and 260 for simultaneous bi-directional transmission and reception. Also included are bi-directional control channels 262 and 264 and common mode rejection circuit 200e as well as ground capacitor 174e. A clock channel is also provided using amplifiers 270 and 272 to provide the clock and inverted clock signals respectively to a reference amplifier 274 and clock output comparator 276. Resistance 278 and 280 are termination resistors that in conjunction with the isolation capacitors 18e provide common mode rejection or suppression. Thus far the invention has been shown implemented with a simple digital to analog converter and analog to digital converter as shown in FIG. 2 or a digital to analog converter and analog to digital converter with encoders and decoders as shown in FIG. 5. However, the invention is not so limited. For example, as shown in FIG. 12, barrier interface circuit 12f may include a digital to analog converter 300 which drives a modulator 302 that provides the constant average signal through isolation barrier 18f to demodulator 304 whose output is delivered to analog to digital converter 306 in barrier interface circuit 22f and provides the digital output at 24f. Termination resistors 56f and 66f may be employed again to meet termination requirements and to suppress common mode errors.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. An isolation system with analog communication across an isolation barrier comprising:
   an isolation barrier circuit having at least one isolation element;
   a digital to analog circuit configured to provide a constant average analog output signal to the isolation barrier and having an input for receiving an input digital signal to be communicated across the isolation barrier, said digital to analog circuit including a digital to analog converter with an input for receiving said input digital signal and an analog modulation circuit responsive to said digital to analog converter for providing said constant average analog output signal; and an analog to digital circuit having an input coupled to the analog output of the isolation barrier circuit for providing a digital output signal.

2. The isolation system of claim 1 in which said analog to digital circuit includes an analog demodulator circuit responsive to said input analog signal from said isolation barrier, and an analog to digital converter responsive to said analog signal to provide said digital output signal.

3. The isolation system of claim 1 in which said isolation element includes a capacitance.

4. The isolation system of claim 1 in which said isolation element includes a transformer.

* * * * *